United States Patent [19]
Ono

[11] Patent Number: 6,157,687
[45] Date of Patent: Dec. 5, 2000

[54] RAKE RECEIVING SYSTEM WITH FINGERS SELECTIVELY PARTICIPATING RAKE SYNTHESIS

[75] Inventor: Shigeru Ono, Tokyo, Japan

[73] Assignee: NEC Corporation, Tokyo, Japan

[21] Appl. No.: 09/094,846

[22] Filed: Jun. 15, 1998

[30] Foreign Application Priority Data

Jun. 16, 1997 [JP] Japan ................................. 9-158175

[51] Int. Cl.⁷ ................................................ H04B 7/10
[52] U.S. Cl. ...................... 375/347; 375/130; 375/136; 375/147; 375/150; 375/316; 370/335; 370/342
[58] Field of Search .................................. 375/347, 130, 375/136, 147, 150, 232, 316; 370/335, 342, 441, 479

[56] References Cited

U.S. PATENT DOCUMENTS

| | | | |
|---|---|---|---|
| 5,671,221 | 9/1997 | Yang | 370/320 |
| 5,940,429 | 8/1999 | Lam et al. | 375/200 |
| 5,953,382 | 9/1999 | Asano et al. | 375/347 |
| 5,974,038 | 10/1999 | Shou et al. | 370/335 |
| 6,067,293 | 5/2000 | Shoji | 370/342 |

FOREIGN PATENT DOCUMENTS 7-231278  8/1995  Japan .

OTHER PUBLICATIONS

Andrew J. Viterbi, "CDMA Principles of Spread Spectrum Communication", Addison–Wesley Publishing Company, 1995, pp. 86–92.

H. Ando, et al., "Performance of RAKE and Space Diversity Using Multi–Pilot–Block Channel Estimation for DS–CDMA", Proceedings of Joint Assembly of the Institute of Electronics, Information and Communication Engineers, B–5–13, 1997, p. 400.

A. Higashi, et al., "Performance of Coherent RAKE Detection Using Interpolation on DS/CDMA", Technical Report of the Institute of Electronics, Information and Communication Engineers, A–P94–74, RCS94–98, (Oct. 1994), pp. 57–62.

*Primary Examiner*—Stephen Chin
*Assistant Examiner*—Mohammad Ghayour
*Attorney, Agent, or Firm*—Ostrolenk, Faber, Gerb & Soffen, LLP

[57] ABSTRACT

A Rake receiving system distributes parts of a receiving signal to fingers for producing weighted parts, and supplies the parts of receiving signal to a pass controlling sub-system; the pass controlling sub-system checks the parts to see whether or not the correlative electric power of each part is equivalent to an average noise power, and each finger calculates a ratio of electric power between an expected receiving signal and non-expected receiving signal; when the correlative electric power is equivalent to a noise power, the associated weighted part is deleted from the Rake synthesis; when the ratio is lower than a threshold, the associated weighted part is also deleted from the Rake synthesis.

4 Claims, 1 Drawing Sheet

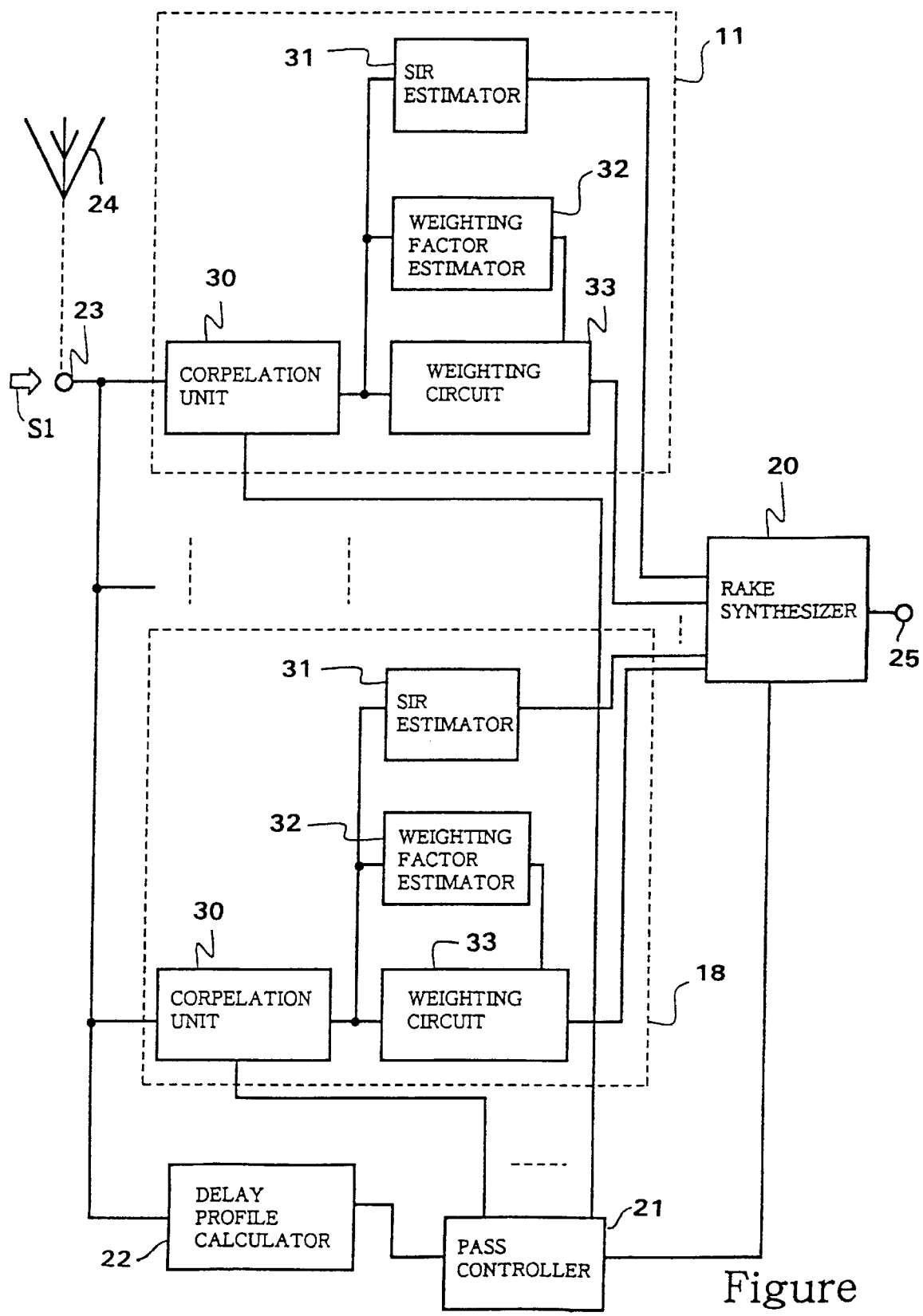
Figure

RAKE RECEIVING SYSTEM WITH FINGERS SELECTIVELY PARTICIPATING RAKE SYNTHESIS

FIELD OF THE INVENTION

This invention relates to a spread spectrum communication system and, more particularly, to a Rake receiving system with fingers selectively participating the Rake synthesis.

DESCRIPTION OF THE RELATED ART

The spread spectrum communication is effective against interference and disturbance, and achieves good reception characteristics in multipath environment. For this reason, the spread spectrum communication is studied for application to a mobile communication network. The spread frequency is so high that the spread spectrum communication system can easily discriminate delay along each multipath propagation channel. This means that the Rake reception is applicable. In the Rake reception, the multipath propagation channel is separated, and the transmission characteristics of the channel are estimated. The transmission characteristics are compensated for the received signals in the multipath propagation channel, and a common-mode synthesis is carried out for the compensated signals. Thus, the Rake reception is a technology to realize the pass diversity effect. The estimation of the transmission characteristics and the compensation are carried out by a multipath component demodulator called as "finger" as described by Andrew J. Viterbi in "CDMA Principles of Spread Spectrum Communication", Addison-Wesley Publishing Company, page 89, 1995. The finger contains a correlative portion, which inversely spreads the spread spectrum code.

If a piece of delay along a multipath propagation channel is separated by using the spread frequency, the Rake reception is a useful for the signal receiving system. The Rake synthesis is described hereinbelow. The characteristics of a multipath propagation channel are expressed by a linear composition of individual paths separable by a signal receiver. Assuming now that i-th path has a relative intensity $\alpha i$, a relative propagation delay time $\tau i$ and variation of phase shift $\phi i$, the complex impulse response $p(t)$ is expressed as $$p(t) = \sum_{i=1}^{L} \alpha i \delta(t - \tau i) \exp(j\phi i) \qquad 1$$

where $\delta$ is the delta function and L is the number of multipath channels. It is possible to consider that separable path components are a linear composition of non-separable path components. The $\alpha i$ is modeled in accordance with Rayleigh distribution or Rice distribution, and $\phi i$ follows the uniform distribution. The transmission base band complex signal is expressed as $\chi(t)$, and $|\chi(t)|$ is equal to "1". Then, the received base band complex signal $\gamma(t)$ is given by equations 2 and 3.

$$\gamma(t) = \sum_{i=1}^{L} Si(t) + n(t) \qquad 2$$

$$Si(t) = \sum_{i=1}^{L} \alpha i \times (t - \tau i) \exp(j\phi i) \qquad 3$$

where $n(t)$ is noise component. The propagation characteristics of the multipath channel is determined on the basis of $\{\alpha i\}$, $\{\tau i\}$ and $\{\phi i\}$. We assume that $\{\alpha i\}$, $\{\tau i\}$ and $\{\phi i\}$ are exactly estimated and that fluctuation of $\{\tau i\}$ and $\{\phi i\}$ are corrected so that we obtain a complex signal $\{si, i=1, \ldots L\}$. Then, relation of $E[Si]=\alpha ij E[Sj \neq i]$ exists. In the relation, $E[\,]$ represents an expectation, $E[Si]=\alpha ij E[Sj \neq i]$ exists. In the relation, $E[\,]$ represents an expectation, and $\alpha ij$ is a real scalar. There are L signals $\{si, i=1, \ldots, L\}$, which are multiples by the real scalar. On the other hand, L noise components independent of each other are expressed as $\{ni, i=1, \ldots, L\}$ A coefficient maximizes the average ratio of signal power to power noise $Jw$ of a weighted synthesis signal under the conditions expressed by equation 4.

$$\sum_{m=1}^{M} Wm = 1 \qquad 4$$

The weighted synthesis signal is expressed by equation 5. The average ratio of signal power to noise power is given by equation 6. The coefficient is expressed by equation 7.

$$\sum_{i=1}^{L} wi(si + ni) \qquad 5$$

$$Jw = \frac{E\left[\left(\sum_{i=1}^{L} wisi\right)^2\right]}{E\left[\left(\sum_{i=1}^{L} wini\right)^2\right]} \qquad 6$$

$$wk \mid opt = \frac{(\sqrt{Sk/Nk})}{\sum_{m=1}^{M} \frac{\sqrt{Sm}}{Nm}} \qquad 7$$

The optimum weighted coefficient makes $Jw$ maximum as expressed by equation 8.

$$Jw \mid \max = \sum_{m=1}^{M} \frac{Sm}{Nm} \qquad 8$$

As will be understood, when the received signals of the respective fingers are weighted by $\alpha i \exp(-J\phi i)/Ni$ and the products are added to one another, we obtain the optimum synthesis signal in the Rake synthesis.

The optimization requires the follow assumptions. First, the propagation characteristics of the multipath channels are exactly estimated. The paths assigned to the fingers are statistically independent. If the assumptions are not proper, the receiving characteristics are degraded. Even if the assumptions are proper, a finger with minus SIR participates the Rake synthesis, the synthesized value is decreased by the minus value. The abbreviation "SIR" means a ratio between the electric power of an expected receiving signal and the electric power of non-expected receiving signal.

A system used in the Rake synthesis is disclosed by Ando et. al. in "Performance of RAKE and Space Diversity using Multi-pilot-block Channel Estimation for DS-CDMA", Proceedings of Joint Assembly of the Institute of Electronics, Information and Communication Engineers, B-5-13, 1997. Another system is disclosed by Higashi et. al. in "Performance of Coherent RAKE Detection using Interpolation on DS/CDMA", Technical Report of the Institute of Electronics, Information and Communication Engineers, A-P94-74, RCS94-98, pages 57 to 62, 1994–10.

The prior art system disclosed by Ando et. al. aims at enhancing the channel estimation. Ando et. al. proposes to use the slot symbol of the adjacent slot during the channel estimation for a certain slot. The prior art system disclosed by Higashi et. al. also aims at enhancing the channel estimation. Higashi et. al. proposes to use not only a pilot symbol but also a data symbol in a feedback decision.

The prior art systems encounter the following problem. Even if a finger degrades the signal receiving characteristics after the Rake synthesis, the prior art systems can not delete the finger from the Rake synthesis. In a downtown area, there are many obstacles such as high rise buildings, and the obstacles create multipath channels, and the multi-path channels are frequently extinguished and recreated. For this reason, both the signal power to noise power ratio (Eb/No) of each path and the signal power to interference power ratio (Eb/Io) of each path are small, and an average is less effective against the noise because of the variation of the propagation path with time. For this reason, when using the provisional decision data as proposed by Higashi et. al, the provisional decision is not reliable due to the small received signal power to noise ratio, and it is impossible to guarantee a certain accuracy for all the fingers. On the other hand, in the case where a common symbol is shared between the plural slots as proposed by Ando et. al, it is impossible to define a lot of slots, because the propagation characteristics are valued with time. For this reason, there is no guarantee to achieve highly accurate channel estimation. Thus, even though the prior art systems include a finger degrading the signal receiving characteristics after the Rake synthesis, it is impossible to remove the finger from the prior art systems. Moreover, even if a finger has minus SIR, the finger still participates the Rake synthesis, and the finger degrades SIR after the Rake synthesis.

SUMMARY OF THE INVENTION

It is therefore an important object of the present invention to provide a Rake receiving system which is improved in signal receiving characteristics.

The present inventor contemplated the problem inherent in the prior art systems, and noticed that SIR quality was not internally monitored. All the fingers participated the Rake synthesis at all times, and the finger with minus SIR degraded SIR after the Rake synthesis. The present inventor concluded that a Rake receiver had to selectively allow fingers to participate the Rake reception.

To accomplish the object, the present invention proposes to periodically measure a working quality of each finger.

In accordance with one aspect of the present invention, there is provided a Rake receiving system comprising a plurality of fingers respectively assigned parts of a receiving signal for producing weighted parts, respectively, each of said plurality of fingers determining the a ratio of electric power between an expected receiving signal and a non-expected receiving signal calculated on the basis of a pilot symbol contained in said receiving signal whether said ratio is larger than a threshold for producing an information signal representative of the determination and a Rake synthesizer connected to said plurality of fingers, responsive to said information signal supplied from said each of said plurality of fingers so as to delete the weighted part of a certain finger specified by said information signal representative of said determination that said ratio is smaller than said threshold from a Rake synthesis and carrying out said Rake synthesis on the weighted parts expect for said weighted part supplied from said certain finger.

BRIEF DESCRIPTION OF THE DRAWINGS

The features and advantages of the Rake receiving system will be more clearly understood from the following description taken in conjunction with the accompanying drawings in which figure is a block diagram showing the arrangement of a Rake receiving system according to the present invention.

DESCRIPTION OF THE PREFERRED EMBODIMENT

Referring to the figure, a Rake receiving system embodying the present invention largely comprises eight fingers 11 to 18, a Rake synthesizer 20, a pass controller 21 and a delay profile calculator 22. The fingers 11 to 18 are the kind of multipath component demodulator as described hereinbefore. An signal input port 23 is connected to the eight fingers 11 to 18 and the delay profile calculator 22, and a received signal S1 is supplied from an aerial 24 through the signal input port 23 to the fingers 11 to 18 and the delay profile calculator 22. The receiving signal S1 has been subjected to a secondary modulation. If the secondary modulation is QPSK, the receiving signal S1 is a kind of two-dimensional signal between I and Q. The receiving signal S1 contains a pilot symbol.

The delay profile calculator 22 extracts the pilot symbol from the receiving signal S1, and calculates a delay profile for a branch on the basis of the pilot symbol. The delay profile is represented by a correlated power between a transmission replica of the pilot symbol and the receiving signal S1. The integral time and the section for calculating the delay profile have been already given, or are given from the outside depending upon the signal receiving characteristics. The integration time is determined in such a manner as to absorb momentary fluctuation on the path. The delay profile is supplied to the pass controller 21 at intervals equal to the integral time.

The fingers 11 to 18 are similar in arrangement to one another, and each finger 11, . . . or 18 includes a correlation unit 30, an SIR estimator 31, a weighting factor estimator 32 and a weighting circuit 33. The receiving signal S1 is supplied to the correlation units 30 of the fingers 11–18, and the correlation units 30 carries out the inverse spreading.

The pass controller 21 accomplishes the following tasks.

First, the pass controller 21 extracts M peaks from the delay profile, and determines the phase or the position of each of the M peaks. The M peaks have large values of the correlative electric power. The pass controller 21 further calculates the average noise power level from the values of the correlative electric power at sampling points outside of the neighborhood of each peak.

Second, the pass controller 21 determines a certain finger to be undetected path. The certain finger is assigned a path showing a correlative power approximately equal to the average noise power. Each finger is assigned a phase. However, the finger assigned the N1th peak from the maximum peak is omitted from the determination of the certain finger.

Third, if a finger is continuously N2 times determined to be undetected path, the pass controller informs the Rake synthesizer of the deletion from the Rake synthesis.

Fourth, if a peak phase is continuously N3 times determined to be detected path and has not been assigned to any finger, the peak phase is assigned to a finger not assigned yet.

Fifth, each peak phase determined to be detected path is assigned to one of the fingers.

The variables N1, N2 and N3 are previously determined by using parameters. The path controller 21 informs the correlation units of the fingers 11 to 18 of the assignment of the peak phases, and further informs the Rake synthesizer 20 of the fingers allowed to participate the Rake synthesis.

Each of the fingers 11 to 18 behaves as follows. The path controller 21 assigns a phase point to be processed to a finger 11, . . . or 18, and the correlation unit 30 of the finger 11–18 carries out the inverse spreading from the specified phase point. The correlation unit supplies a portion corresponding to the pilot symbol to the weighting factor estimator 32 and the SIR estimator 31. A portion corresponding to a receiving data symbol is supplied to the weighting circuit 33.

Using the estimating method disclosed by Ando et. al. or Higashi et. al, the weighting factor estimator 32 carries out the channel estimation for the propagation paths assigned to the fingers 11 to 18. The weighting circuit 33 multiplies the value of the receiving signal by the conjugate complex number of the estimated weighting factor, and the product is supplied to the Rake synthesizer 20.

The SIR estimator 31 calculates SIR of the received portion assigned to the finger 11–18. As described hereinbefore, SIR represents the ratio of electric power of an expected receiving signal and non-expected receiving signal. The electric power of an expected receiving signal is the average electric power of the pilot symbol, and the electric power of the non-expected receiving signal is a dispersion of an estimated pilot symbol estimated on the basis of a dispersion of the pilot symbol. The estimated SIR is compared with a given threshold. The result, i.e., whether SIR is larger or smaller than the threshold is supplied to the Rake synthesizer 20 as a flag signal.

The Rake synthesizer 20 deletes the following fingers from the Rake synthesis. They are the finger or fingers specified by the pass controller 21 and a finger which the associated SIR estimator 31 decides to have SIR smaller than the threshold. The Rake synthesizer 20 carries out the common mode addition on the weighted parts of the receiving signal supplied from the remaining fingers. The sum is output from an output port 25.

Thus, the Rake receiving system according to the present invention carries out the Rake synthesis on the selected fingers. The pass controller 21 decides the fingers 11–18 to be deleted from or participate the Rake synthesis on the basis of the average characteristics, and the SIR estimators 31 decides the fingers 11–18 to be deleted from or participate the Rake synthesis on the basis of the momentary characteristics. The Rake synthesis is prevented from erroneous channel due to a quasi-peak. Moreover, even though correct paths are captured, the Rake receiving system deletes a momentarily deteriorated slot from the Rake synthesis. Thus, the Rake synthesis is improved.

As will be appreciated from the foregoing description, the Rake receiving system according to the present invention judges the quality of a part of the receiving signal at intervals for each of the fingers 11 to 18, and allows the fingers 11 to 18 to selectively participate the Rake synthesis on the basis of the judgement. As a result, the Rake reception is made close to the conditions required by the Rake reception, and the receiving characteristics are improved. The Rake receiving system according to the present invention can respond to momentary variation of the multipath channel. The path controller determines fingers allowed to participate the Rake synthesis on the basis of the average characteristics, and prevents the Rake synthesis from an erroneous path due to a quasi peak. The SIR estimators 31 cause the Rake synthesizer to delete a receiving slot momentarily deteriorated. Thus, the Rake receiving system surely improves the receiving characteristics.

Although a particular embodiment of the present invention has been shown and described, it will be apparent to those skilled in the art that various changes and modifications may be made without departing from the spirit and scope of the present invention.

For example, a Rake receiving system may have plural fingers less than eight or more than eight.

What is claimed is:

1. A Rake receiving system comprising
a plurality of fingers respectively assigned parts of a receiving signal for producing weighted parts, respectively, each of said plurality of fingers determining a ratio of electric power between an expected receiving signal and a non-expected receiving signal calculated on the basis of a pilot symbol contained in said receiving signal whether said ratio is larger than a threshold for producing a first information signal representative of the determination, and
a Rake synthesizer connected to said plurality of fingers, responsive to said information signal supplied from said each of said plurality of fingers so as to delete the weighted part of a certain finger specified by said first information signal representative of said determination that said ratio is smaller than said threshold from a Rake synthesis and carrying out said Rake synthesis on the weighted parts expect for said weighted part supplied from said certain finger.

2. The Rake receiving system as set forth in claim 1, in which the electric power of said expected receiving signal is an average electric power of said pilot symbol, and the electric power of said non-expected receiving signal is a dispersion of an estimated pilot symbol estimated on the basis of a dispersion of said pilot symbol.

3. The Rake receiving system as set forth in claim 1, further comprising a pass controlling sub-system determining another certain finger supplied with the part of said receiving signal having a correlative electric power equivalent to an average noise power for supplying a second information signal representative of said another certain finger, wherein said Rake synthesizer deletes said another certain finger from said Rake synthesis.

4. The Rake receiving system as set forth in claim 3, in which said pass controlling sub-system includes a delay profile calculator calculating a delay profile for each of said parts of said receiving signal at intervals equal to an integral time, and a pass controller estimating said average noise power from peaks of correlative electric power selected from said delay profile and determining whether or not said correlative electric power is equivalent to said average noise power for producing said second information signal.

* * * * *